Patented June 17, 1952

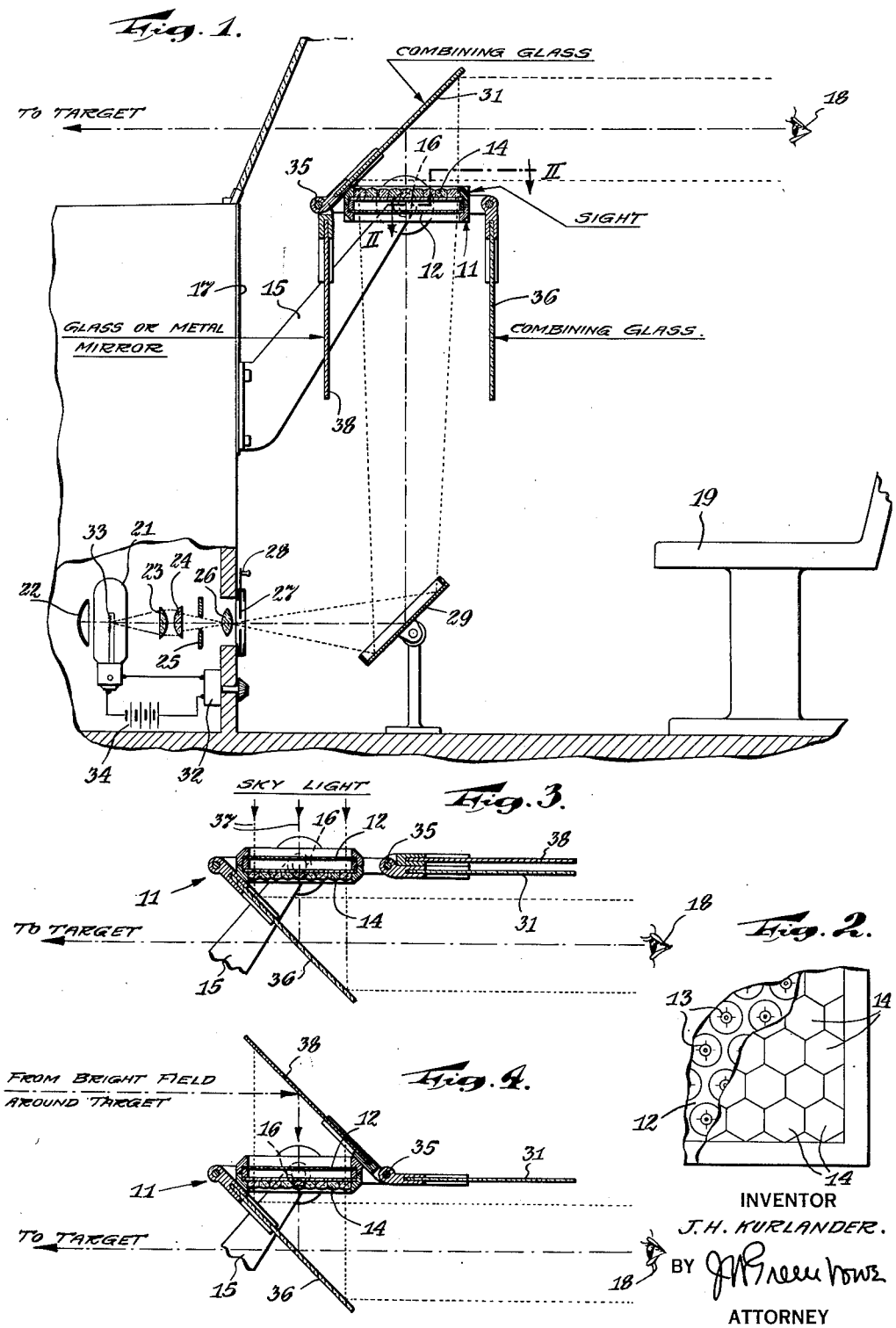

2,600,662

UNITED STATES PATENT OFFICE 2,600,662

MULTILENTICULAR COLLIMATING GUN SIGHT DEVICE AND OPTICAL SYSTEM

John H. Kurlander, Nutley, N. J., assignor to Westinghouse Electric Corporation, East Pittsburgh, Pa., a corporation of Pennsylvania Application February 26, 1944, Serial No. 524,033

9 Claims. (Cl. 88—2.3)

This invention relates to optical systems, and more particularly, to such for illuminating the reticle plate of a multi-lenticular collimating gun sight.

The principal object of my invention, generally considered, is to provide for the illumination to a high intensity of the reticle plate of a multi-lenticular collimating gun sight, said illumination being preferably in the alternative, so that light can be received on said reticle plate from either a lamp or a natural source.

Another object of my invention is to provide a multi-lenticular collimating gun sight which is vertically adjustable and reversible so that illumination may be obtained from a lamp, sky light, or the field of the target.

A further object of my invention is to provide a multi-lenticular collimating gun sight with a combining glass and mirror pivoted to one edge and another combining glass pivoted to the other edge, thereby adapting it for use in either the usual position or reversed, so that it may be illuminated either from a source of light therebelow, from the sky, or from the field of the target.

A still further object of my invention is to provide means for illuminating the reticle plate of a multilenticular collimating gun sight comprising a projector lamp, a condenser lens, a rectangular mask, an iris diaphragm, and a 45° reflecting mirror for directing the beam from said lamp on said reticle plate.

An additional object of my invention is to provide a multi-lenticular collimating gun sight with a pivoted combining glass and pivoted mirror whereby illumination on the reticle plate thereof may be obtained from the sky or from the target field.

Other objects and advantages of the invention, relating to the particular arrangement and construction of the various parts, will become apparent as the description proceeds.

Referring to the drawing:

Fig. 1 is an axial sectional view of portions of an airplane showing a multi-lenticular collimating gun sight with means for illuminating the reticle plate thereof from a single projector lamp.

Fig. 2 is a fragmentary sectional view on an enlarged scale on the line II—II of the gun sight device of Fig. 1.

Fig. 3 is a fragmentary view corresponding to Fig. 1 but showing the gun sight device reversed for illumination of the reticle plate by means of sky light.

Fig. 4 is a view corresponding to Fig. 3 but showing the interposition of a mirror to cut off the sky light and receive light from only the field around the target, such as when the target is viewed against the sun.

In certain gun sights of the so-called "Reflex" or reflector type used by the Army and Navy Air Forces, a reticle on which the sight lines are inscribed is placed at the focal point of a compound projecting lens system, so that a virtual image of the reticle sight lines is projected into the field of view of the gunner or observer. If a light source is placed immediately behind, the reticle will be visible when an observer's eye is placed anywhere within the marginal limits of the image beam projected by the lens system.

The projected image beam is for the stated purpose reflected at right angles, as by means of a transparent glass plate having parallel surfaces and placed at an angle of 45° to said beam, so that the axis of the reflected beam coincides with the axis of the aiming sight lines between the gunner's eye and the target. A gunner looking through the telescopic tube will, therefore, see the target delineated within the field of sight around the bright field of the sun, sky or clouds. Superimposed on the target will be the image of the illuminated reticle. The gunner then manipulates his plane until one attacking or a ground station anti-aircraft gun, for example, lines up with the sighting reticle image.

When the brightness of the field against which the target is delineated is low, as at dawn or dusk, or when the sky is heavily overcast, the problem of illuminating the reticle bright enough to render it clearly visible is not difficult. However, it is common practice for the pilots of attacking planes to operate with the sun at their backs so that the defending gunner will be blinded by the sun's glare. A neutral filter is used to reduce the sun's brightness with consequent reduction in the target's view. Even so, the brightness of the sky surrounding the sun is so much brighter than that of an ordinary lamp-illuminated reticle that the image of the latter is washed out and the defending gunner left virtually helpless.

In accordance with my application Serial No. 474,372, filed February 1, 1943, now Patent No. 2,441,823, dated May 18, 1948, and entitled "Reflector Lamp and Optical System," I have shown how to remedy the aforesaid condition by making use of the image properties of a smooth concave surface for strongly illuminating the reticle in order to make it visible even against a very bright background.

The purpose of the present invention is to illuminate to a high intensity the reticle plate of a multi-lenticular collimating gun sight, which is an improvement over the reticle of the simple gun sight of my prior application, in that it gives the observer or "gun pointer" leeway so that he does not have to keep his eye on the axis of the light from any one reticle, but may move it to use the reticle which is most convenient.

The sight in question has a multiplicity of reticles of the circle and dot form, that is, reticles inscribed on a single glass plate and arranged in staggered rows so as to form a continuous mosaic of reticle patterns, ordinarily measuring approximately 7" x 5.4". Each single reticle is provided with a separate projection lens, one juxtaposed with respect to each pattern, the lenses being of hexagonal outline and abutting each other on all sides so as to form a solid rectangle of individual projection lenses, the optical axes of which are, as usual, substantially parallel, each lens projecting its respective pattern to infinity.

In accordance with the practice prior to my invention, a single small lamp placed at one focal point of an ellipsoidal reflector was used to illuminate each individual reticle pattern. This method of illumination is extremely cumbersome and severely limited in its ability to illuminate the reticle patterns to such intensity to permit full daytime use of the sight.

In accordance with my invention I illuminate the entire reticle plate, that is, all of the pattern thereon, by means of: (1) a single light source, such as a projection lamp in a single projection system, (2) light from the sky, (3) light from the field around the target, or (4) provide for the selective use of any one of said sources at will, in accordance with conditions.

If a single projection lamp is used, the beam of light therefrom is desirably projected through a small aperture (in the instrument panel of the plane carrying the gunsight, for example), in which aperture is mounted an iris diaphragm for regulating the degree of illumination on the reticle plate. If additional control is required, a resistance may be wired in series with the lamp filament for either day or night use.

Referring to the drawing illustrating my invention, and first considering the arrangement illustrated in Figs. 1 and 2, there is shown a standard multi-lenticular collimating gun sight 11, including a reticle plate 12 on which is inscribed a mosaic of reticle patterns 13, which in the present instance are illustrated as each of the circle and dot type. Each pattern has its individual hexagonal lens 14, said lenses in the aggregate forming a solid rectangle, and each lens projecting its respective reticle pattern to infinity.

The gun sight 11 is shown rotatably mounted on a bracket 15, about a pivot indicated at 16, said bracket being vertically adjustable as by sliding on a track 17, and adapted to be clamped at a selected elevation so that it is in a convenient position with respect to the observer's eye 18, as when the observer is seated in the chair 19.

The sight, in accordance with the arrangement in Figs. 1 and 2, is to be illuminated from a single projection lamp 21 and associated reflector 22, the light therefrom passing through combining lenses 23 and 24, a rectangular mask 25, a projection lens 26, an iris diaphragm 27 manually adjustable at handle 28, then reflected by mirror 29 upon the reticle plate 12, the illumination thereof passing through the lenses 14 and reflected by the transparent reflector plate, mirror or combining glass 31, corresponding with the glass 35 of Fig. 7 of my application previously referred to, so as to be viewed simultaneously with the target by the observer's eye 18. For further control, a manually adjustable rheostat 32 in series with the lamp filament 33 and source of power 34 is desirably provided. The combining glass 31 is pivoted to the sight 11 as indicated at 35, so that the arrangement is adaptable for other conditions, such as if and when it is desired to substitute natural illumination for that by means of a lamp.

Such alternatives are illustrated in Figs. 3 and 4, Fig. 3 representing the sight inverted, as by turning through 180° about its pivot 16 and by moving the bracket 15 upward on its track so that the other transparent reflector plate, mirror or combining glass 36, positioned at an angle of 45°, is at a convenient elevation for the observer's eye 18, where the reticles are illuminated directly by light from the sky as indicated by the arrows 37, the light from which then passes through the lenses 14 and is reflected by the combining glass 36 into the observer's eye 18.

This alternative is particularly for daytime use of the sight, making use of the natural sky brightness. Inasmuch as the loss of transmission through the sight is relatively low, the order of reticle brightness when so illuminated will be sufficient to render them visible against all ordinary conditions of sky brightness. This arrangement will serve in all cases except where the target is viewed directly against the sun or within 10° or 15° of the sun's disk.

The alternative arrangement illustrated in Fig. 4 is to permit viewing the target against the sun. It makes use of a preferably pivoted rectangular metal or glass reflector 38, disposed at an angle of 45°, and attached to the sight so as to reflect light from the target area down through the reticle plate and into the lens system as illustrated. In this way the pilot of the plane or observer, when viewing the target through the combining glass 36, will always see the reticles lighted to a fixed percentage of the field brightness, this percentage depending upon the transmission of light through the sight.

For night illumination involving lighting intensities close to the threshold of the pilot's vision, the method of illuminating illustrated in Figs. 1 and 2 may, of course, be substituted for the natural illumination of Figs. 3 and 4.

From the foregoing it will be seen that I have provided an improved means for illuminating the reticle plate of a multi-lenticular collimating gun sight, either at night or when the daylight is insufficient, as by means of a single projection lamp, reflector, lens, and mirror system, or when daylight is sufficiently intense by reversing, elevating and substituting either sky or target field illumination, thereby giving a range of adjustment adapting the illumination for all conditions which will be met in service.

Although a preferred embodiment of my invention has been disclosed, it will be understood that modifications may be made within the spirit and scope of the appended claims.

I claim:

1. An optical system comprising a multi-lenticular collimating gun sight with a plurality of reticles inscribed on a single glass plate and arranged in staggered rows forming a continuous mosaic of reticle patterns and a corresponding series of lenses, one for each pattern, said device being pivotally mounted so that it may be disposed with the lenses above the reticles at a selected elevation, or inverted with its elevation correspondingly changed, and provided with combining glasses hinged adjacent opposite edges so as to reflect light to an observer's eye when the reticle plate is disposed beneath the lenses and receives light from below or when it is disposed above said lenses and receives light from above, and a mirror pivoted adjacent the rear edge of said sight, when disposed so as to receive light from above, to reflect light from the target field onto said reticle plate.

2. A multi-lenticular collimating gun sight device with a plurality of reticles inscribed on a single plate and arranged in staggered rows forming a continuous mosaic of reticle patterns, and a corresponding series of lenses one for each pattern, said device being pivotally mounted so that it may lie with the lenses above the reticles at a selected elevation, or be inverted with its elevation correspondingly changed, and combining glasses hinged adjacent opposite edges so as to reflect light to an observer's eye when the reticle plate is disposed beneath the lenses and receives light from below, or when it is disposed above said lenses and receives light from above, and a mirror pivoted adjacent the edge of said sight which is rearwardly disposed when receiving light from above, to reflect light from another direction upon said reticle plate.

3. An optical system comprising a multi-lenticular collimating gun sight device having a plurality of reticles inscribed on a single glass plate and arranged in staggered rows forming a continuous mosaic of reticle patterns and a corresponding series of lenses, one for each pattern, the optical axes of said lenses being substantially parallel, said device being pivotally mounted on an axis substantially parallel to said plate so that it may lie with the lenses above the reticles or be inverted, so as to receive light to illuminate the reticle plate from either of two directions, a mirror to reflect light from a target field to illuminate all of said reticles, with the light therefrom passing through said lenses, and a combining glass for directing the reticle illumination light passing through said lenses toward the eye of an observer, so that he may use any reticle, without being restricted to a particular one.

4. An optical system comprising a multi-lenticular collimating gun sight device with a plurality of reticles inscribed on a single glass plate and arranged in staggered rows forming a continuous mosaic of reticle patterns, and a corresponding series of lenses, one juxtaposed with respect to each pattern and axially alined therewith, the optical axes of said lenses being substantially parallel, said device being reversibly mounted and provided with a combining glass on one edge, so that when said plate is disposed above its lenses the device may receive illumination from above directed through the reticle plate and said lenses, and the combining glass may redirect it toward the eye of an observer, said device being also provided with a movably-mounted mirror extending from the opposite edge thereof for reflecting light from a target field onto said reticle plate, whereby said plate may receive such light or, upon moving said mirror out of the way receive light directly from the sky.

5. A gun sight device with a plurality of reticles in a single plane and a corresponding series of lenses one for each reticle, the optical axes of said lenses being substantially parallel, means pivotally mounting said device on an axis substantially parallel to said plane so that it may lie with the lenses above the reticles at a selected elevation, or be inverted and its elevation correspondingly changed, whereby it may receive light through the reticles to the lenses from a source either above or below the device, and mirrors, one pivoted to one edge and another to the opposite edge of said device for selectively projecting said light received from the selected source after passing through said lenses from the illuminated reticles, toward the eye of an observer.

6. A multi-lenticular collimating gun sight device with a plurality of reticles inscribed on a single plate and arranged in staggered rows so as to form a continuous mosaic of reticle patterns, and a corresponding series of lenses, one for each pattern, the optical axes of said lenses being substantially parallel, said device being pivotally mounted so that it may lie with the lenses below the reticles at a selected elevation or be inverted and its elevation correspondingly changed, whereby it may receive light through the reticles to the lenses from a source either above or below, and mirrors, one pivoted to one edge and another to the opposite edge of said device, for projecting said received light, of the source selected after passing through said lenses, from the illuminated reticle plate, toward the eye of an observer.

7. A multi-lenticular collimating gun sight device with a plurality of reticles inscribed on a single glass plate and arranged in staggered rows forming a continuous mosaic of reticle patterns, and a corresponding series of lenses, one juxtaposed with respect to each pattern and axially alined therewith, the optical axes of said lenses being substantially parallel, said device being pivotally mounted on an axis substantially parallel to said plate so that it may lie with the lenses above the reticles or be inverted, so as to receive light to illuminate the reticle plate from either of two directions, and a mirror pivoted to one edge portion of said device so as to be adjustable for reflecting light from a third direction and directing it onto said reticle plate and through the juxtaposed lenses.

8. A multi-lenticular collimating gun sight device with a plurality of reticles inscribed on a single plate and arranged in staggered rows forming a continuous mosaic of reticle patterns, and a corresponding series of lenses one for each pattern, the optical axes of said lenses being substantially parallel, said device being pivotally mounted so that it may lie in a given position substantially at a selected elevation, or be inverted from said position and its elevation changed as desired, and combining glasses hinged adjacent opposite edges of said device, for receiving light through the reticles to the lenses from a source either above or below, and projecting said received light, after passing through said lenses, from the illuminated reticle plate, toward the eye of an observer.

9. A multi-lenticular collimating gun sight device with a plurality of reticles inscribed on a single glass plate and arranged in staggered rows forming a continuous mosaic thereof and a corresponding series of lenses, one juxtaposed with respect to each reticle and axially aligned therewith, the optical axes of said lenses being substantially parallel, said device being pivotally mounted on an axis substantially parallel to said plate so that it may be inverted to receive light from either of two directions, and a pair of mirrors pivoted to the same edge portion of said device so as to be adjusted for either reflecting light from a third direction onto said reticle plate and through the juxtaposed lenses or for projecting light after passing from a source through said lenses, from the illuminated reticle plate, toward the eye of an observer.

JOHN H. KURLANDER.

REFERENCES CITED

The following references are of record in the file of this patent:

UNITED STATES PATENTS

| Number | Name | Date |
| --- | --- | --- |
| Re. 19,070 | Chretien | Feb. 6, 1934 |
| 533,324 | Stevens | Jan. 29, 1895 |
| 683,203 | Grubb | Sept. 24, 1901 |
| 826,155 | Dudley | July 17, 1906 |
| 922,938 | Mustin | May 25, 1909 |
| 1,634,934 | Donaldson | July 5, 1927 |
| 1,705,146 | Willson | Mar. 12, 1929 |
| 1,966,850 | Colt | July 17, 1934 |
| 2,086,182 | Dvornik | July 6, 1937 |
| 2,174,003 | Ives | Sept. 26, 1939 |
| 2,190,569 | MacGill | Feb. 13, 1940 |
| 2,313,204 | Morelle | Mar. 9, 1943 |
| 2,324,444 | Wappler | July 13, 1943 |
| 2,359,484 | Link | Oct. 2, 1944 |
| 2,364,152 | MacGill | Dec. 5, 1944 |

FOREIGN PATENTS

| Number | Country | Date |
| --- | --- | --- |
| 21,456 | Great Britain | Sept. 20, 1909 |
| 526,225 | Germany | June 3, 1931 |
| 751,309 | France | June 19, 1933 |
| 437,444 | Great Britain | Oct. 28, 1935 |
| 538,422 | Great Britain | Aug. 1, 1944 |